(12) United States Patent
Kondo

(10) Patent No.: US 6,480,523 B1
(45) Date of Patent: Nov. 12, 2002

(54) SPECTRUM SPREADING COMMUNICATION SYSTEM USING SINGLE SPREADING CODE

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/260,021

(22) Filed: Mar. 2, 1999

(30) Foreign Application Priority Data

Mar. 4, 1998 (JP) .......................................... 10-052292

(51) Int. Cl.$^7$ ............................ H04B 1/69; H04L 27/06
(52) U.S. Cl. ...................................... 375/140; 375/316
(58) Field of Search .............................. 375/140, 136, 375/137, 130, 142, 144, 145, 347, 349, 346, 343, 316; 370/342, 335, 320; 455/500, 517, 526, 509

(56) References Cited

U.S. PATENT DOCUMENTS

| | | | | |
|---|---|---|---|---|
| 5,559,789 A | | 9/1996 | Nakano et al. ................ 370/18 |
| 5,812,593 A | * | 9/1998 | Kaku .......................... 370/342 |
| 5,943,362 A | * | 8/1999 | Saito .......................... 370/342 |
| 6,097,947 A | * | 8/2000 | Takai .......................... 455/127 |
| 6,345,045 B1 | * | 2/2002 | Yanagi ........................ 370/342 |

FOREIGN PATENT DOCUMENTS

| | | |
|---|---|---|
| JP | 56-102143 | 8/1981 |
| JP | 59-50603 | 3/1984 |
| JP | 63-202144 | 8/1988 |
| JP | 2-39139 | 9/1990 |
| JP | 5-227124 | 9/1993 |
| JP | 6-152564 | 5/1994 |
| JP | 7-30514 | 1/1995 |
| JP | 7-221700 | 8/1995 |
| JP | 7-226710 | 8/1995 |
| JP | 7-231278 | 8/1995 |

* cited by examiner

*Primary Examiner*—Chi Pham
*Assistant Examiner*—Khai Tran
(74) *Attorney, Agent, or Firm*—Foley & Lardner

(57) ABSTRACT

A spectrum spreading communication system including a radio base station includes a receiving section, a correlation detecting section, a rake synthesizing section and a control section. The receiving section receives a radio signal to produce a digital burst signal. Transmission data of the radio signal respectively include different pilot patterns and data, are subjected to spectrum spreading using a single spreading code, and are transmitted on a same frequency band. The correlation detecting section performs a tracking operation to the burst signal for each of paths to produce a tracking resultant data. The paths are specified based on a path data. The correlation detecting section also detects a component of the burst signal correlated with the spreading code for each path based on the tracking resultant data. The rake synthesizing section performs rake synthesis to the components from the correlation detecting section for each of the pilot patterns. The control section determines path candidates from the burst signal to output the path data corresponding to the path candidates to the correlation detecting section, and controls the rake synthesizing section to perform the rake synthesis to the components from the correlation detecting section for each of the pilot patterns.

25 Claims, 7 Drawing Sheets

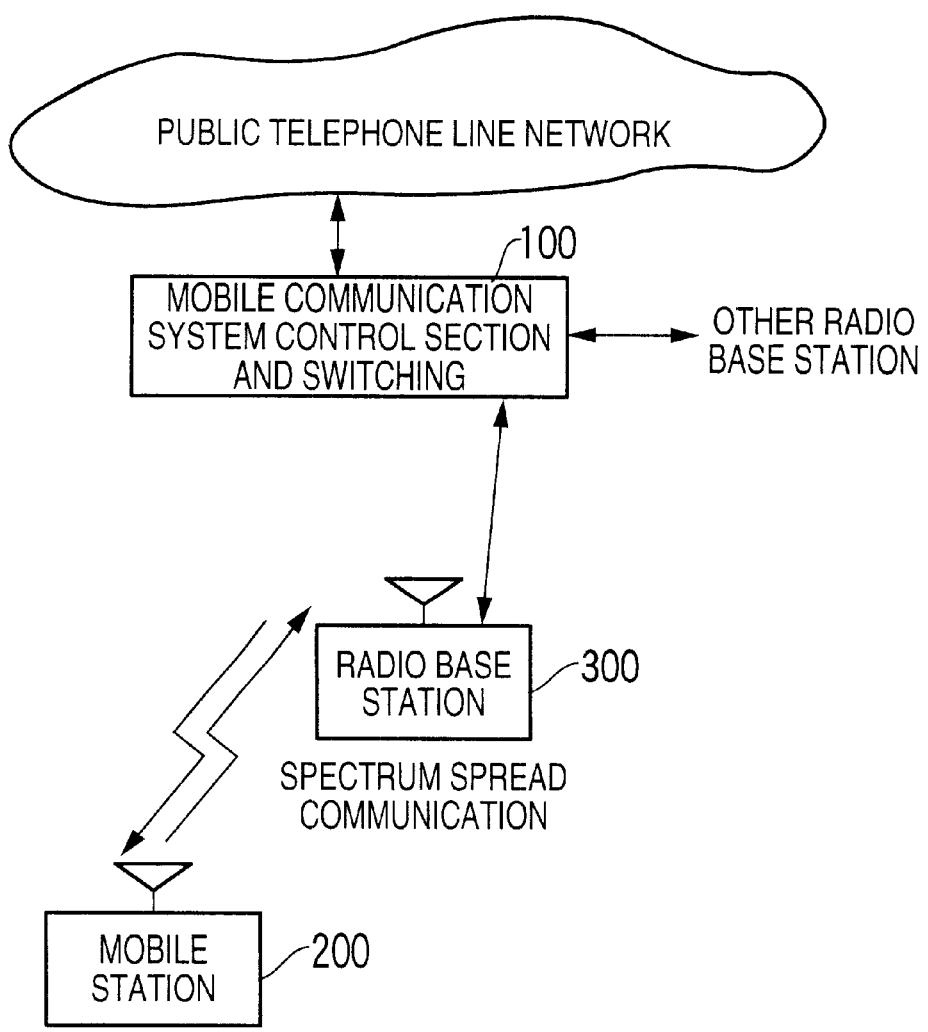

SHORT CODE

1 CHIP

PL SYMBOL

CODE PATTERN DETERMINED FROM SHORT CODE AND PL SYMBOL

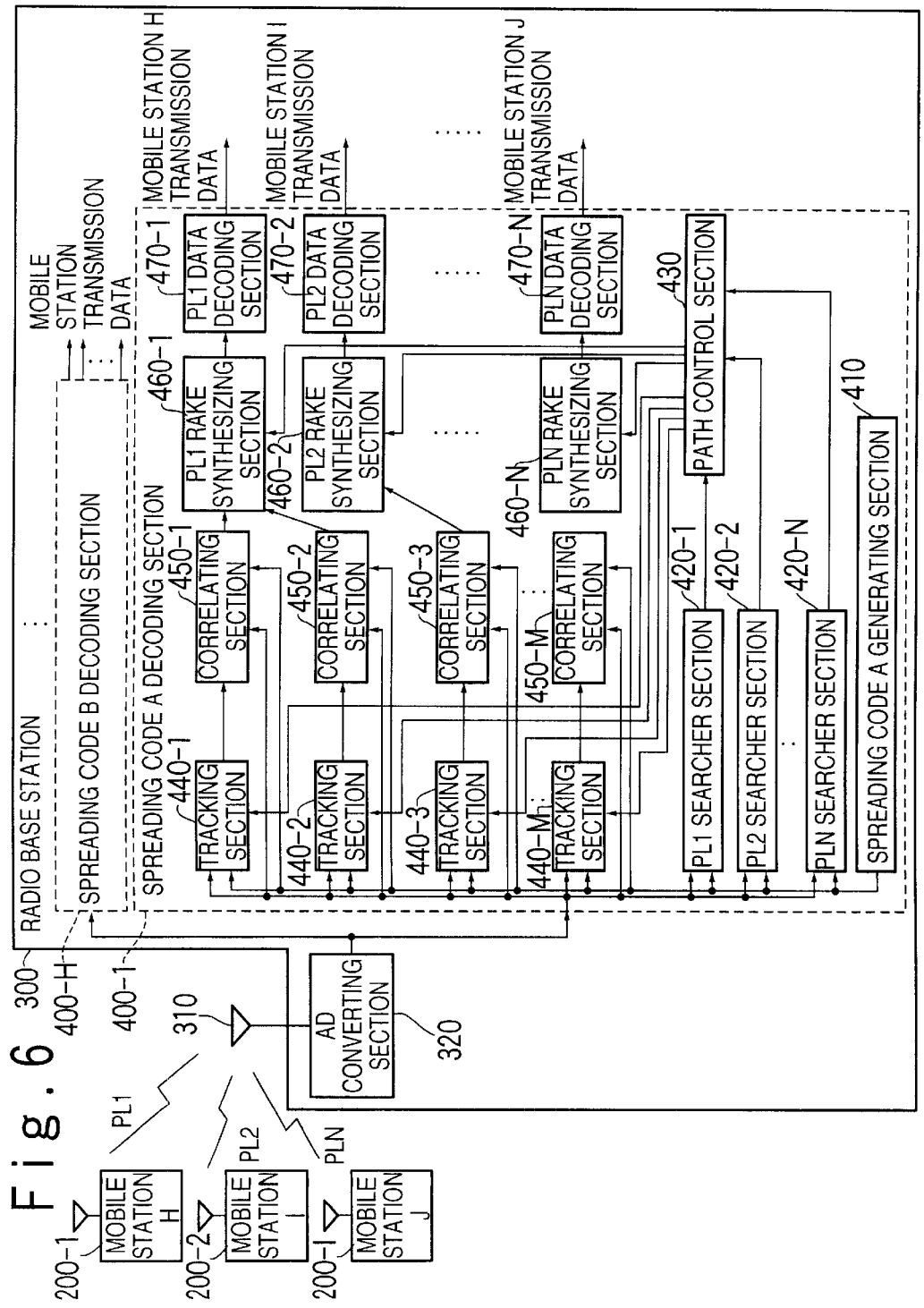

Fig.7A-1
SHORT CODE  1  -1  -1  1
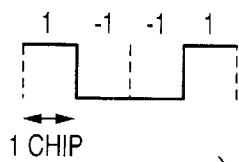
1 CHIP

Fig.7A-2
PL SYMBOL  1  1  -1  -1
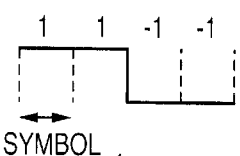
1 SYMBOL

Fig.7A-3
CODE DETERMINED FROM SHORT CODE AND PL SYMBOL (PATTERN NO.0)

1 -1 -1 1  1 -1 -1 1  -1 1 1 -1  -1 1 1 -1

Fig.7B-1
SHORT CODE  1  -1  -1  1
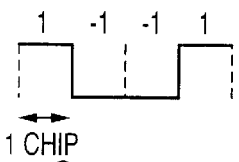
1 CHIP

Fig.7B-2
PL SYMBOL  1  1  1  1
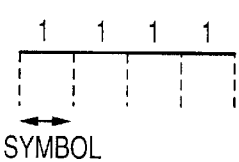
1 SYMBOL

Fig.7B-3
CODE EXAMPLE DETERMINED FROM SHORT CODE AND PL SYMBOL OF RECEPTION SIGNAL (PATTERN NO.1)

1 -1 -1 1  1 -1 -1 1  1 -1 -1 1  1 -1 -1 1
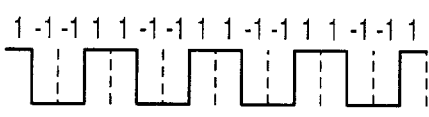

Fig.7C-1
CODE EXAMPLE OF PL SEARCHER SECTION (PATTERN NO.0)

1 -1 -1 1  1 -1 -1 1  -1 1 1 -1  -1 1 1 -1
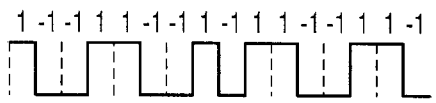

Fig.7C-2
CODE EXAMPLE OF RECEPTION SIGNAL (PATTERN NO.0)

1 -1 -1 1  1 -1 -1 1  -1 1 1 -1  -1 1 1 -1
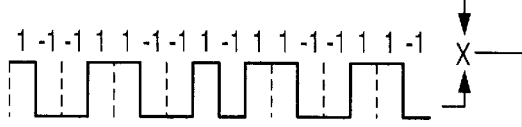

Fig.7C-3
CORRELATION COMPONENT  1+1+1+1+1+1+1+1+1+1+1+1+1+1+1+1=16

Fig.7C-4
CODE EXAMPLE OF RECEPTION SIGNAL (PATTERN NO.1)

1 -1 -1 1  1 -1 -1 1  1 -1 -1 1  1 -1 -1 1
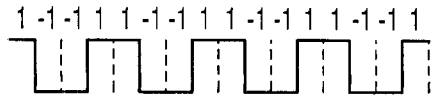

Fig.7C-5
CORRELATION COMPONENT  1+1+1+1+1+1+1+1-1-1-1-1-1-1-1-1=0

SPECTRUM SPREADING COMMUNICATION SYSTEM USING SINGLE SPREADING CODE

BACKGROUND OF THE INVENTION

1. Field of the Invention

The present invention relates to a spectrum spreading communication system, and more particularly to a spectrum spreading communication system suitable for a random burst signal transmitted from a plurality of mobile stations to a radio base station on a same frequency band at a same time using a same spreading code.

2. Description of the Related Art

As a conventional mobile communication system using a spectrum spreading communication system of this type is known the technique disclosed in Japanese Laid Open Patent Application (JP-A-Heisei 5-227124), for example. FIG. 1 is a block diagram illustrating an example of a reception system used in a CDMA communication system as the conventional technique.

The CDMA communication system is composed of a single radio base station 300 and a plurality of mobile stations 200. A spreading code is allocated for the communication between the radio base station 300 and each mobile station 200 such that the bidirectional communication can be performed. The radio base station 300 synthesizes a pilot signal spread based on a short period code P, one period of which is set as one bit, and data transfer signals spread based on long period codes A, C and E corresponding to the respective mobile stations 200. The synthesized signal is transmitted to the mobile stations 200. The respective mobile stations 200 performs inverse spreading to the reception data transfer signal using the long period codes A, C and E allocated to the mobile stations, respectively. Also, the respective mobile stations 200 spreads data transfer signals using the transmission long period codes B, D and F, respectively. The radio base station 300 performs inverse spreading to a reception data transfer signal using reception long period codes B, D and F corresponding to the respective mobile stations 200.

In such a structure, synchronization is established between a generation timing of the short period code P and each of the long period codes A to F. Also, a time mark is contained in a pilot signal to indicate a bit position of the long period code corresponding to the pilot signal so that it is possible to separate the long period codes into groups and to allocate them to a lot of mobile stations. Therefore, the synchronization can be quickly established using the pilot signal of the short period code. Also, the synchronization of a corresponding group part of the long periods code can be established based on the time mark contained in the pilot signal so that the synchronization of the long period code can be easily and quickly established. Therefore, it is possible to provide the CDMA communication system in which it is made possible to allocate unique codes to a lot of mobile stations while keeping an access random function.

However, in such a technique disclosed in Japanese Laid Open Patent Application (JP-A-Heisei 5-227124), special controls are required. That is, there are synchronization establishment between the pilot signal and the data communication signal, insertion and excerption of the time mark, and the generation of a partial mark which matches to the time mark. Therefore, there is a problem in that the circuit scale becomes large so that the circuit becomes complicated.

Also, in another conventional technique, a plurality of mobile terminals transmits an same spreading code. In case of the reception of burst signals in which the plurality of mobile terminals perform access requests to a radio base station at the same time using the common spreading code, the respective signals interfere with each other.

Also, in such burst communication, it is difficult to strictly perform the transmission power control which is indispensable technique in the spectrum spreading communication system.

For these reasons, the dispersion of the levels of the signals received by the radio base station becomes large so that a delay profile used to detect paths is disordered. As a result, there is a problem in degradation of a path detecting capability.

Further, even if an initial synchronization correlating unit (a searcher) captures burst signals from the mobile stations, the mobile station in each path can not be easily identified. Therefore, there is a problem in that it is impossible to optimally realize the rake synthesis which is the technique to remarkably improve the communication quality peculiar to the spectrum spreading communication system.

In addition to the above reference, a spectrum spreading communication system is disclosed in Japanese laid Open Patent application (JP-A-Showa 56-102143). In this reference, a base band signal is formed by adding a data to be transmitted and a pilot signal. On a side of reception, the pilot signal is detected such that synchronization is established.

Also, a transmission signal system is disclosed in Japanese laid Open Patent application (JP-A-Showa 59-50603). In the this reference, a sync signal is transmitted with a transmission signal via a digital phase modulation communication line. Upon reception, the control of an antenna is performed using the sync signal as an its identification reference signal.

Also, an automobile telephone system is disclosed in Japanese laid Open Patent application (JP-A-Showa 63-202144). In the this reference, a plurality of communication channels are divided in frequency. A spectrum spreading communication is used for a line control channel to perform line control of the communication channels. A spectrum spreading code sequence on the line control channel corresponds to a mobile station telephone number.

Also, a receiving apparatus in a spectrum spreading communication system is disclosed in Japanese Examined Patent application (JP-B-Heisei 2-39139). In the this reference, the receiving apparatus is composed of a first quasi-noise code generating section, a correlation detector, a clock generating section, a second quasi-noise code generating section, a control section, and a demodulating section. The first quasi-noise code generating section generates a first quasi-noise code which always changes the phase for an inputted spectrum spread reception signal. The correlation detector always detects the correlation state between the spectrum spread reception signal and the first quasi-noise code to detect the state of the spectrum spread reception signal. The clock generating section generates a clock to control the first quasi-noise code generating section based on the detecting result by the correlation detector such that the phase of the first quasi-noise code always changes for the spectrum spread reception signal. The second quasi-noise code generating section generates a second quasi-noise code. The control section controls the second quasi-noise code from the second quasi-noise code generating section in accordance with the detecting information by the correlation detector such that the spectrum spread reception signal is coincident with the second quasi-noise code. The demodulating section performs the demodulation of the spectrum spread reception signal based on the second quasi-noise code controlled by the control section.

Also, a receiving apparatus in a spectrum spreading communication system is disclosed in Japanese Laid Open Patent application (JP-A-Heisei 6-152564). In the this reference, [step 111] existence or non-existence of a carrier of a Busy Tone is detected prior to a packet transmission. When an "L" level is detected over a predetermined time, a step 112 is executed. Also, a signal outputted from its station and a signal outputted from another station are compared to know a channel acquirement result of its station. When the signal is changed to the "H" level during a channel acquirement period, the channel acquirement is discarded and then a receiving process is performed. [Step 112] A shift register outputs its identification code as the Busy Tone for one data. [Steps 113 and 114] It is determined whether all the Busy Tone data are transmitted, a PN code is continuously transmitted based on a PN code table, when a signal corresponding to a B station comparison level is kept in the state of "L" level for the channel acquirement period. Thus, a frequency band can be effectively used and a plurality of communication stations can communicate with each other at the same time in a spectrum spreading communication system.

Also, a spectrum spreading communication system is disclosed in Japanese Laid Open Patent application (JP-A-Heisei 7-30514). In the this reference, a matching filter 1 performs an inverse spectrum spreading to a reception signal R1 to which a spectrum spreading is performed, with an inverse spreading code R2 to produce a pulse sequence R2. A transmission path estimating section 2 estimates the transmission characteristics of a multi-path transmission path in response to a pilot signal R1a contained the reception signal R2 to produce tap coefficients R4 (R4a). A transversal filter 3 performs tap weighting using the tap coefficients R4 to produce the maximum ratio synthesis signal R5 of the pulse sequence R3. A multi-path interference reproducing section 5 reproduces a multi-path interference signal R8 in response to the tap coefficients R4a, a demodulating signal R6 and the inverse spreading code R2. A subtracting section 7 subtracts an interference signal from a delay synthesis signal R5a which has been delayed from a synthesis signal R5 by a delay section 6. A determining section 8 determines a subtracting signal R9 to output a demodulation signally. Thus, a multi-path interference signal of a received spectrum spreading signal is removed in a base band.

Also, a CDMA/TDD system radio communication system is disclosed in Japanese Laid Open Patent application (JP-A-Heisei 7-221700). In the this reference, in addition to the structure of a conventional CDMA/TDD system radio communication system, a base station is further composed of means 15 for generating a pilot signal having a constant transmission power level to each of the mobile stations and known to the mobile station, and means 16 for transmitting the pilot signal to the mobile station via a transmission path. Also, each mobile station is further composed of means 19 for measuring transmission power of the received pilot signal and means 8 for controlling transmission power of a power amplifier circuit 10 based on the reception power of the measured pilot signal.

Also, a CDMA/TDD system radio communication system is disclosed in Japanese Laid Open Patent application (JP-A-Heisei 7-226710). In this reference, in addition to the structure of a conventional CDMA/TDD system radio communication system, a base station is further composed of means 15 for generating a pilot signal having a constant transmission power level to each of the mobile stations and known to the mobile station, means 16 for transmitting the pilot signal to the mobile station via a transmission path, and single tone generating means 26 for always transmitting to the mobile station, a single tone having a single frequency and a constant transmission power level. Also, each mobile station is further composed of means 19 for measuring transmission power of the received pilot signal, means 28 for measuring a reception power of the single tone, and means 8 for controlling transmission power of a power amplifier circuit 10 based on the measured reception power of the pilot signal and the measured reception power of the single tone.

Also, a rake receiving apparatus of a direct spectrum spreading communication system is disclosed in Japanese Laid Open Patent application (JP-A-Heisei 7-231278). In this reference, a direct spreading modulation signal S30 of N paths is received by a first to N-th inverse spreading sections $50_1$ to $50_N$ and then the received signals S30 are subjected to inverse spreading and demodulation using a first to N-th spreading sequences synchronous with N signals S30 in which reception timings are different from each other. The demodulation data $D40_1$ to $D40_N$ are synthesized by a synthesizing section 51. The level differences between a signal having the maximum one of levels of the N signals S30 and other signals are determined. When each of the level differences is larger than a predetermined threshold value T, inverse spreading means for performing the inverse spreading and demodulation to the signals having level difference larger than the threshold value T from the maximum level (for example, $50_{N-2}$, $50_{N-1}$, $50_N$) is controlled to be set to an off state.

SUMMARY OF THE INVENTION

The present invention is accomplished to solve the above-mentioned problems. Therefore, an object the present invention is to provide a spectrum spreading communication system in which communication can be performed in good quality, even if a plurality of mobile stations access a radio base station with burst signals using a same spreading code and a same frequency band.

Another object of the present invention is to provide a spectrum spreading communication system in which a multi-path can be identified to make a rake synthesis possible so that communication quality can be improved.

In order to achieve an aspect of the present invention, a spectrum spreading communication system including a radio base station includes a receiving section, a correlation detecting section, a rake synthesizing section and a control section. The receiving section receives a radio signal to produce a digital burst signal. Transmission data of the radio signal respectively include different pilot patterns and data, are subjected to spectrum spreading using a single spreading code, and are transmitted on a same frequency band. The correlation detecting section performs a tracking operation to the burst signal for each of paths to produce a tracking resultant data. The paths are specified based on a path data. The correlation detecting section also detects a component of the burst signal correlated with the spreading code for each path based on the tracking resultant data. The rake synthesizing section performs rake synthesis to the components from the correlation detecting section for each of the pilot patterns. The control section determines path candidates from the burst signal to output the path data corresponding to the path candidates to the correlation detecting section, and controls the rake synthesizing section to perform the rake synthesis to the components from the correlation detecting section for each of the pilot patterns.

Each of the transmission data includes an identifier data of a mobile station which has transmitted the transmission data. The radio base station further includes a data decoding section for decoding signals outputted from the rake synthesizing section, and for extracting the mobile station identifier data contained in the decoded signals to specify mobile stations, respectively.

The control section may include a plurality of searcher section respectively provided for the pilot patterns, wherein each of the plurality of searcher section determines larger likelihood levels between the corresponding pilot pattern and the burst signal, and a path control section for determining the path candidates based on the larger likelihood levels over the pilot patterns to output the path data to the correlation detecting section, and for controlling the rake synthesizing section to perform the rake synthesis to the components from the correlation detecting section for each of the pilot patterns. In this case, each of the searcher section performs in-phase addition between a code sequence of the corresponding pilot pattern and a pilot pattern component of the burst signal to determine the path candidates having larger results of the in-phase additions.

Also, the control section may include a a searcher section for determines the path candidates having larger likelihood levels between the spreading code and the burst signal, a plurality of kind detecting sections respectively provided for the pilot patterns, wherein each of the plurality of kind detecting sections determines one of the pilot patterns for each of the path candidates, and a path control section for outputting the path data to the correlation detecting section based on the detected pilot patterns by the plurality of kind detecting sections, and for controlling the rake synthesizing section to perform the rake synthesis to the components from the correlation detecting section for each of the pilot patterns. In this case, each of plurality of kind detecting sections performs in-phase addition between a code sequence of the corresponding pilot pattern and a pilot pattern component of the burst signal to determine the path candidates having larger results of the in-phase additions.

Also, the correlation detecting section may include a plurality of tracking sections, each of which performs a tracking operation to the burst signal for a corresponding one of the paths to produce a portion of the tracking resultant data, and a plurality of correlating sections which are provided for the plurality of tracking sections, and each of which detects a component of the burst signal correlated with the spreading code for each path based on the tracking resultant data.

In addition, a spreading code decoding section may include the correlation detecting section, the rake synthesizing section, the control section and the data decoding section. In this case, the spectrum spreading communication system further comprises a plurality of the spreading code decoding sections respectively provided for a plurality of the spreading codes.

In order to achieve another aspect of the present invention, a method of communicating from the plurality of mobile stations to the radio base station, in a spectrum spreading communication system including a radio base station and a plurality of mobile stations, comprising the steps of:

transmitting transmission data from the plurality of mobile stations as radio signals on a same frequency band, wherein the transmission data respectively include different pilot patterns and data, the different pilot patterns are allocated to the plurality of mobile stations, and the transmission data are subjected to spectrum spreading by the plurality of mobile stations using a single spreading code, respectively;

receiving the radio signals to produce a digital burst signal;

determining path candidates from the burst signal to generate the path data corresponding to the path candidates;

performing a tracking operation to the burst signal for each of paths to produce a tracking resultant data, the paths being specified based on a path data;

detecting a component of the burst signal correlated with the spreading code for each path based on the tracking resultant data; and performing rake synthesis to the components from the correlation detecting section for each of the pilot patterns to produce rake synthesis signals for communication.

BRIEF DESCRIPTION OF THE DRAWINGS

FIG. 2 is a block diagram illustrating the structure of a mobile communications system in a spectrum spreading communication system of the present invention;

FIGS. 5B-1 and 5B-2 are diagrams of pilot signal (PL) symbols, and FIGS. 5C-1 and 5C-2 are diagram of code patterns determined from the short code and the PL symbols;

FIG. 6 is a block diagram illustrating the structure of a reception unit of a radio base station in the spectrum spreading communication system according to the first embodiment of the present invention;

FIGS. 7A-1 and 7A-2 are a diagram of a short code and a diagram of a pilot signal (PL) symbol, and FIG. 7A-3 is a diagram of a code pattern determined from the short code and the PL symbol, FIGS. 7B-1 and 7B-2 are a diagram of another short code and a diagram of another pilot signal (PL) symbol, and FIG. 7B-3 is a diagram of another code pattern determined from the short code and the PL symbol, FIG. 7C-1 is a diagram of a code example of a pilot signal searcher section, FIGS. 7C-2 and 7C-3 are diagrams of a code example of a reception signal, and a likelihood level of a correlation component, and FIGS. 7C-4 and 7C-5 are diagrams of a code example of another reception signal, and a likelihood level of another correlation component.

DESCRIPTION OF THE PREFERRED EMBODIMENTS

Next, the spectrum spreading communication system of the present invention will be described with reference to the attached drawings.

Figure 5A:
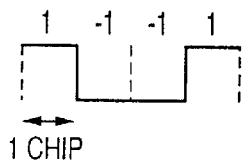
FIG. 5A is a diagram of a short code.
Figures 1, 5B:
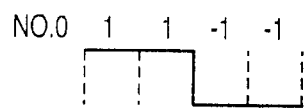
Figures 2, 5B:
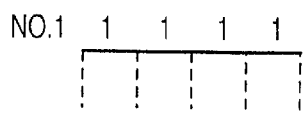
Figures 1, 5C:
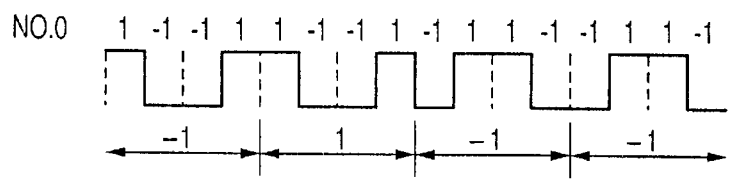
Figures 2, 5C:
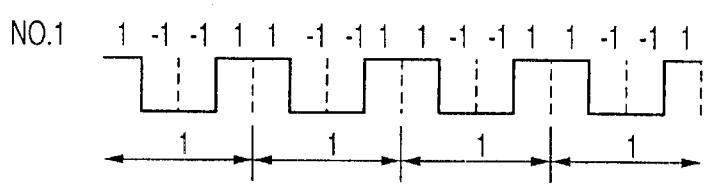

FIG. 2 is a block diagram illustrating the structure of a mobile communication network in the spectrum spreading communication system of the present invention. In FIG. 2, the mobile communication network is connected to a public telephone line network as an existing wire communication network through a mobile communication system control section and a switching apparatus 100. The communication is processed in the mobile communication network and between the mobile communication network and the public line network by the mobile communication system control section and the switching apparatus 100. It should be noted that the mobile communication system control section and the switching apparatus 100 are apparatuses which include a switching apparatus for the mobile communication and a control unit which controls a plurality of radio base stations 300 of the mobile communication network. The radio base station 300 forms a radio zone in which mobile communication service is provided to the plurality of mobile station 200 through electromagnetic wave transmitted from and received by the radio base station 300.

Between the radio base station 300 and the mobile stations 200 is adopted a communication system so-called CDMA (Code Division Multiple Access) system or a spectrum spreading communication system. In the communication system, a transmission signal is spread with an allocated spreading code to be transmitted on a same frequency band, and a reception signal is subjected to inverse spreading using the same spreading code on a receiving unit.

In the spectrum spreading communication system of the present invention, when the plurality of mobile stations 200 transmit call originating requests and data packets in burst signals, the radio base station 300 is randomly accessed. In a usual spectrum spreading communication, a spreading code is allocated to each mobile station to function as an exclusive use traffic channel so that orthogonality to the other communications is kept. This is like the communication after the call originating request from the mobile station 200 is accepted and communication with a destination side is started. However, in the present invention, the burst signals spread by use of the same spreading code are received by a receiving unit of a radio base station.

That is, one feature of the present invention is in that a pilot (PL) pattern is allocated for each mobile station 200. The allocation and registration of the pilot pattern to the plurality of mobile stations 200 in advance make it possible to identify a short code having orthogonality such as the Gold code and the Walsh code by use of a plurality of pattern symbols. For example, when the number of patterns of the pilot pattern is 8, a pilot pattern (0) to pilot pattern (7) are repeatedly allocated to the mobile stations in order in accordance with identification numbers of the mobile stations. Each mobile station adds the allocated pilot pattern to a transmission data in case of transmission of a burst signal.

Figure 3:
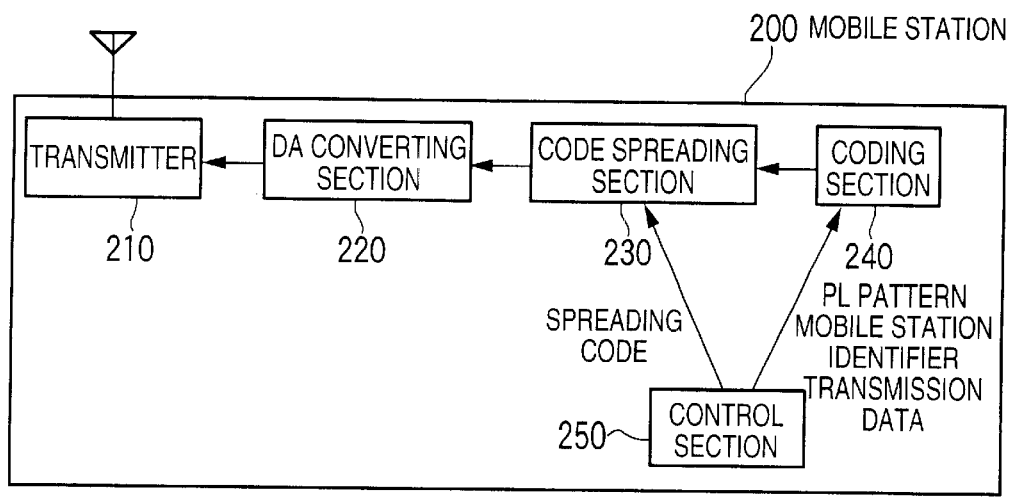
FIG. 3 is a block diagram illustrating the structure of a transmission unit of a mobile station in the spectrum spreading communication system of the present invention.
Figure 4:
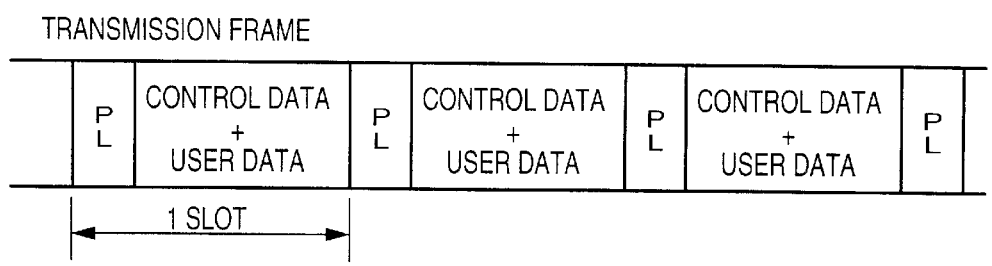
FIG. 4 is a diagram illustrating an example of a signal format transmitted from the mobile station in the spectrum spreading communication system of the present invention.

FIG. 3 is a block diagram illustrating the structure of a part of the mobile station 200 concerned with the transmission of the burst signal. FIG. 4 shows a signal format of a transmission data in a transmission frame.

The mobile station 200 is composed of a transmitter 210, an AD converting section 220, a code spreading section 230, a coding section 240 and a control section 250. The coding section 240 codes the above-mentioned pilot pattern, the mobile station identifier including the identification number of the mobile station and the transmission data under the control of the control unit 250 to produce a transmission frame, in case of transmission of a call originating request and random access by use of a data packet. The coded transmission frame is subjected to a spectrum spreading process by the code spreading section 230. A spreading code used at this time is a burst transmission spreading code which has been notified from the radio base station through a notice channel, when the mobile station enters the radio zone of the radio base station. Three or four kinds of spreading codes or one kind of spreading code in a special case is prepared only in the radio base station. The control unit 250 supplies the burst transmission spreading code notified in advance to the code spreading section 230, since the burst transmission is performed. The transmission frame to which spectrum spreading is performed by the code spreading section 230 is subjected to digital (D)/analog (A) conversion by the DA converting section 220 and outputted from the transmitter 210 in the form of electromagnetic wave.

An example of a transmission frame of the transmission signal outputted in this way is shown in FIG. 4. Also, examples of the pilot pattern is shown in FIGS. 5A to 5C-2.

Next, the structure of the radio base station in the spectrum spreading communication system of the present invention will be described with reference to FIG. 6. FIG. 5 is a block diagram illustrating the structure of a part of a reception system of the radio base station to which the communication system of the present invention is applied.

The radio base station 300 is composed of an antenna 310, an AD converting section 320, and spreading code decoding sections 400-I to 400-H provided for spreading codes and having the same structure. The spreading code decoding section 400-I for a spreading code A is composed of a spreading code A generating section 410, pilot pattern (PL) searcher sections 420-1 to 420-N, a path control section 430, tracking sections 440-1 to 440-M, correlating sections 450-1 to 450-M, pilot pattern (PL) data rake synthesizing sections 460-1 to 460-N, and pilot pattern (PL) data decoding sections 470-1 to 470-N.

The plurality of mobile stations 200-1 to 200-I access the radio base station 300 using signals obtained by performing spectrum spreading processes to the burst signals including pilot patterns PL1 to PLN by use of the burst transmission spreading codes.

In the radio base station 300, the burst signals are received by the antenna 310, and the reception signals are subjected to analog/digital conversion in the AD converting section 320. Then, inverse spreading processes are performed in the spreading code decoding sections 400 to take out signal data. As the spreading code decoding sections, the plurality of spreading code decoding sections 400-1 to 400-H are provided for the respective spreading codes.

The detailed structure of the spreading code decoding section, a spreading code A decoding section 400-1 for the burst signal using a spreading code A as an example will be described.

First, the spreading code generating section 410 to generate the spreading code A for the inverse spreading process.

Then, one feature of the present invention is in that PL searcher sections 420-1 to N, PL RAKE synthesizing sections 460-1 to N and PL data decoding sections 470-1 to N in correspondence to the kinds of the above-mentioned PL patterns which are prepared in advance as the system.

The burst signals are received by the antenna 310 and subjected to a analog/digital conversion by the AD converting section 320 to produce a digital reception signal. Each of the pilot pattern searcher sections 420-1 to 420-N inputs the spreading code A outputted from the spreading code generating section 410 and the digital reception signal. The pilot pattern searcher section determines a likelihood level of a correlation component between the spreading code A and the digital reception signal in a search range or a profile for every pilot pattern. More specifically, the correlation component is determined through in-phase addition of pilot pattern components to be described later, using a code sequence of each pilot pattern of the digital reception signal and the spreading code A. As a result, a multi-path or paths of the reception burst signals are detected for every pilot pattern.

Each of the pilot pattern rake (PL RAKE) synthesizing sections 460-1 to 460-N perform rake synthesis of the correlation components for the multi-path for every pilot pattern. Each of the pilot pattern (PL) data decoding sections 470-1 to 470-N function to decode the signal outputted after the rake synthesis for each PL pattern and to extract the mobile station identifier contained in the decoded signal to specify and output a mobile station identification number.

As the other components, it is provided with the plurality of tracking sections 440-1 to 440-M, each of which inputs the spreading code A outputted from the spreading code A generating section 410 and the digital reception signal from the analog/digital converting section 320. The tracking section performs a tracking process to a specific path. The tracking process is a process to track a small change of a reception path timing which is generated due to a change of a signal propagation delay between the mobile station and the radio base station because of a position change of the mobile station.

Each of the correlating units 450-1 to 450-M inputs the spreading code A outputted from the spreading code generating section 410 and the digital reception signal from the analog/digital converting section and determines a correlation component between the digital reception signal and the spreading code A in accordance with the output of the corresponding tracking section. The path control unit 430 performs the control to be mentioned later.

The path control unit 430 inputs path data outputted from the pilot pattern searcher sections 420-1 to 420-N and determines the tracking sections 440-1 to 440-M by which the tracking process should be performed to the paths. Also, the path control unit 430 issues instructions to the pilot pattern rake synthesizing sections 460-1 to 460-N. Each of the pilot pattern rake synthesizing sections 460-1 to 460-N connects ones of the correlating sections 450-1 to 450-M which output path signals for the same PL pattern to a corresponding one of the pilot pattern synthesizing sections in response to a corresponding one of the instructions.

An operation of the radio base station 300 structured in this way will be described below.

In FIG. 6, the burst signals from the mobile stations 200-1 to 200-I are received by the antenna 310, converted into a digital form by AD converting section 320 and then supplied to the spreading code A decoding section 400-1.

In the spreading code A decoding section 400-1, each of the PL searcher sections 420-1 to 420-N detects and outputs a plurality of paths having the larger PL component in-phase addition levels as the candidates of the paths for every pilot pattern. Also, the pilot pattern searcher section calculates a correlation component of a pilot pattern portion of the digital reception signal and a code sequence as a result of exclusive OR operation of the spreading code A and the pilot pattern corresponding to the pilot pattern searcher section over a search region. Thus, the profile of the pilot pattern component in-phase addition is determined as likelihood levels for paths. Then, the predetermined number of paths in order of the larger pilot pattern component in-phase addition are detected as the path candidates for the specific spreading code, the spreading code A in this example and the specific pilot pattern. The chip phases of the path candidates detected by each of the PL searcher sections 420-1 to 420-N and the likelihood levels are sent to the path control unit 430.

FIGS. 7A-1 to 7C-5 are diagrams illustrating the principle of the detection of the correlation component performed by the PL searcher sections. Two examples of the pilot pattern are shown in FIGS. 7A-1 to 7A-3 and FIGS. 7B-1 to 7B-3. It should be noted that these diagrams are the same as those shown in FIGS. 5A to 5C-2. A pilot pattern is shown to use the short code of 4 chips one period and pilot pattern symbol of 4 symbols as the example. The code sequence of pattern No. 0 is a code sequence which is determined based on a short code of "1, −1, −1, 1" and a pilot pattern symbol "1, 1, −1, −1". Also, the code sequence of pattern No. 1 is a code sequence determined based on a short code "1, −1, −1, 1" and a pilot pattern symbol "1, 1, 1, 1".

Figure 1:
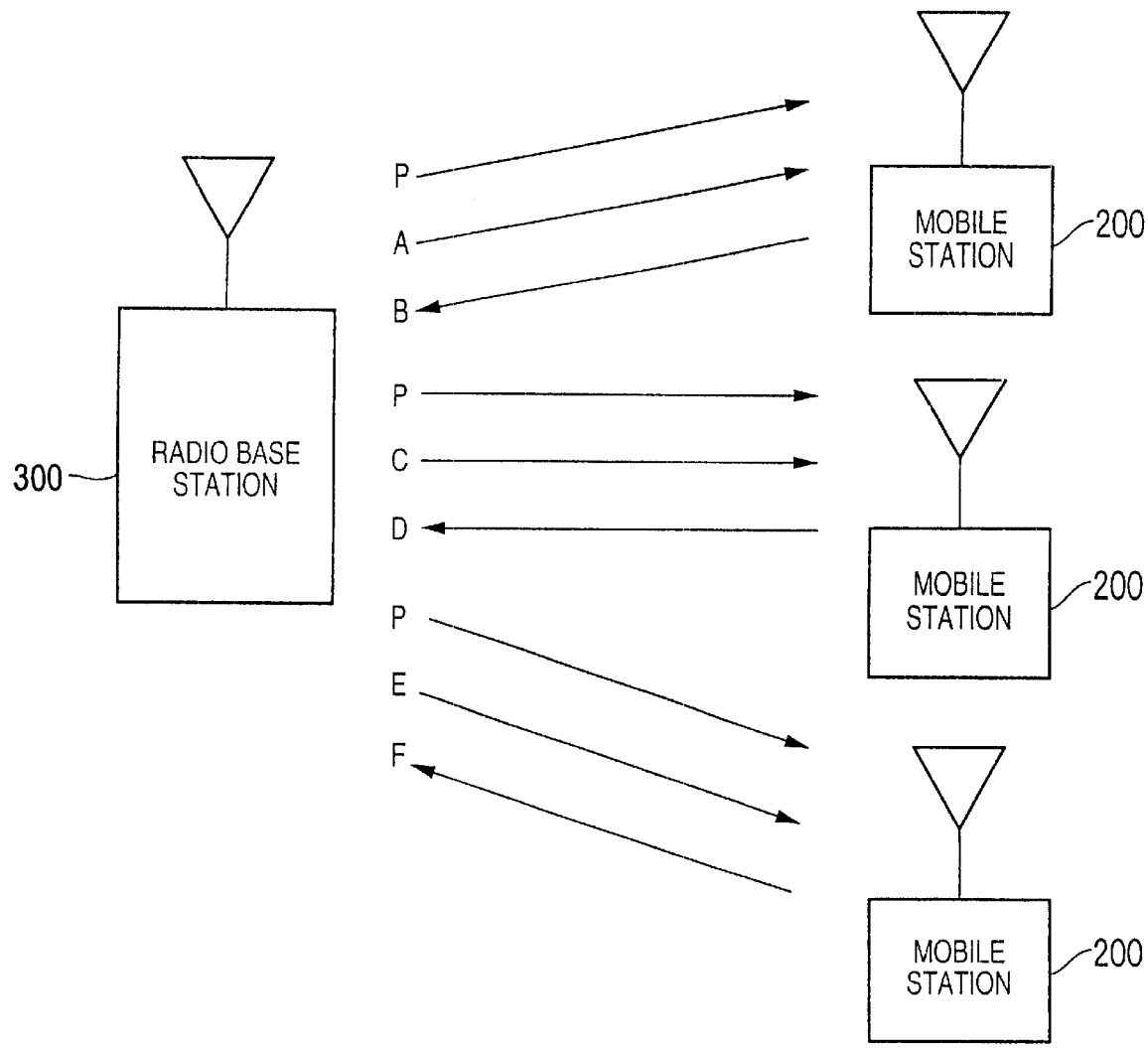
FIG. 1 is a block diagram illustrating the concept of a conventional spectrum spreading communication system.

Now, it is supposed that the pilot pattern No. 1 (PL1) searcher section 420-1 has the code sequence of a pilot pattern shown in FIGS. 7A-1 to 7A-3. The principle for determining a correlation component between each code sequence of the reception signal and the code sequence of the pilot pattern of the PL1 searcher section 420-1 is shown in FIGS. 7C-1 to 7C-5.

As seen from FIGS. 7C-1 to 7C-5, if the code sequence of the reception signal is coincident with the pattern No. 0, a correlation component of "16" is obtained as shown in FIG. 7C-3, when the timings are coincident with each other. However, in case of a different code sequence of pattern, a correlation component of "0" is obtained as shown in FIG. 7C-5, even if the timings are coincident with each other. By this, each of the pilot pattern searcher sections 420-1 to 420-N identifies and takes out only the reception signal which has the same PL pattern as the code sequence of the PL pattern of the pilot pattern searcher section. Thus, the chip phases as the peaks of the multi-path are detected.

Next, referring to FIG. 6 once again, the outputs of the pilot pattern searcher sections 420-1 to 420-N, operations of the path control unit 430, the tracking sections 440-1 to 440-M, the correlating units 450-1 to 450-M and the pilot pattern (PL) rake synthesizing sections 460-1 to 460-N will be described.

For simple description, it is supposed that the pilot patterns of PL1, PL2 and PL3 are allocated for three mobile station 200-1 to 200-3, respectively. Also, it is supposed that a spectrum spreading process is performed using the spreading code A and a burst signal is transmitted. Also, it is supposed that each of the pilot pattern searcher sections 420-1 to 420-N detects four peaks of #1 to #4 in order of larger likelihood level to output the chip phases of the paths corresponding to peaks together with the likelihood level values to the path control section 430. Further, it is supposed that 10 sets of the tracking section and the correlating sections are provided. In such a condition, the paths of the four peaks #1 to #4 rch are represented as x1 to x4, y1 to y4, z1 to z4, respectively. Also, it is supposed that the likelihood level value of the each peak to the spreading code A takes a value indicated in ( ).

| PL pattern | #1 peak | #2 peak | #3 peak | #4 peak |
|---|---|---|---|---|
| PL1 | x1 (1) | x2 (3) | x3 (6) | x4 (7) |
| PL2 | y1 (2) | y2 (5) | y3 (8) | y4 (10) |
| PL3 | z1 (4) | z2 (9) | z3 (11) | z4 (12) |

The path control unit 430 rearranges the respective likelihood level values in order of higher level value to the spreading code A based on these data.

| 01 | 02 | 03 | 04 | 05 | 06 | 07 | 08 | 09 | 10 | 11 | 12 |
|---|---|---|---|---|---|---|---|---|---|---|---|
| x1 | y1 | x2 | z1 | y2 | x3 | x4 | y3 | z2 | y4 | z3 | z4 |

Now, since the number of sets of the tracking sections and the correlating units is 10, the path control unit 430 selects the 10 paths in order of higher level values, and then transfers data indicative of the 10 paths to the respective tracking sections.

| order | 01 | 02 | 03 | 04 | 05 | 06 | 07 | 08 | 09 | 10 |
|---|---|---|---|---|---|---|---|---|---|---|
| path | x1 | y1 | x2 | z1 | y2 | x3 | x4 | y3 | z2 | y4 |

That is, instructions are issued such that the tracking section 440-1 tracks the path of x1, the tracking section 440-2 tracks the path of y1, the tracking section 440-1 tracks the path of x1, the tracking section 440-3 tracks the path of x2, . . . , the tracking section 440-10 tracks the path of y4. The correlating unit corresponding to each tracking section outputs the correlation component of the reception signal with the spreading code A in the corresponding path. The path control unit 430 issues instructions to the pilot pattern rake synthesizing sections 460-1 to 460-3 to connect the outputs of ones of the correlating sections 440-1 to 440-10 corresponding to the same PL pattern with the corresponding pilot pattern rake synthesizing section.

Each of the pilot pattern rake synthesizing sections 460-1 to 460-3 performs rake synthesis of output signals for the same path. That is, since the correlating sections 450-1, 450-3, 450-6, 450-7 output the correlation components of the reception signal for the path of the pilot pattern PL1, the output of each correlating section is connected to the pilot pattern rake synthesizing section 460-1. Since the correlating sections 450-2, 450-5, 450-8, 450-10 output the correlation components of the reception signal for the path of the pilot pattern PL2, the output of each correlating section is connected to the pilot pattern rake synthesizing section 460-2. Also, since the correlating sections 450-4, 450-9 output the correlation components of the reception signal for the path of the pilot pattern PL3, the output of each correlating section is connected to the pilot pattern synthesizing section 460-3.

The signals obtained by performing rake synthesis in the each of the pilot pattern rake synthesizing sections 460-1 to 460-3 are decoded by the pilot pattern (PL) data decoding sections 470-1 to 470-3 corresponding to the respective pilot patterns. As a result, the identifier data of the mobile station contained in the decoded data is extracted and outputted as the reception signal for which each mobile station is specified In this way, in the spectrum spreading communication system of the present invention, a plurality of paths (the multi-path) having a correlation component to the spreading code A for each pilot pattern in the pilot pattern searcher section are detected. The tracking operation to each path and correlation component extraction of the reception signal are performed based on the detected path data. Therefore, even if the burst signals using the same spreading code are received from the plurality of mobile station at the same time on a same frequency band, it is possible to reliably distinguish the signal from each mobile station and to perform the rake synthesis so that the communication quality can be remarkably improved.

Next, the spectrum spreading communication system according to the second embodiment of the present invention will be described with reference to FIG. 8.

Figure 8:
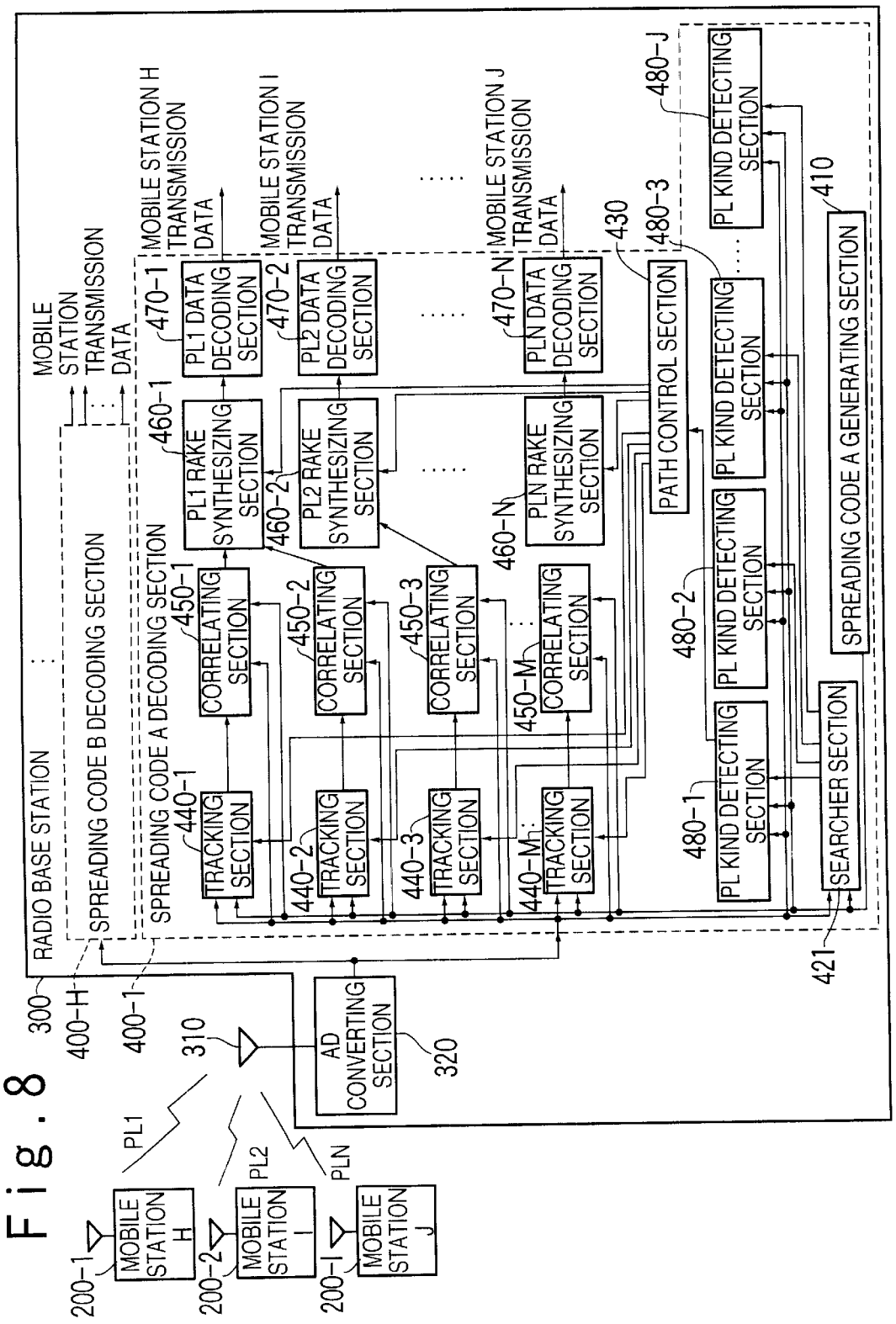
FIG. 8 is a block diagram illustrating the structure of the reception unit of the radio base station in the spectrum spreading communication system according to the second embodiment of the present invention.

FIG. 8 is a block diagram illustrating the structure of the radio base station 300 according to the second embodiment of the present invention. One feature of the present invention is in that it is provided with a searcher section 421 and a plurality of pilot pattern (PL) kind detecting sections 480-1 to 480-J in the second embodiment, instead of the plurality of pilot pattern searcher sections provided in the first embodiment.

The spreading code A generating section 410, the path control unit 430, the tracking sections 440-1 to 440-M, the correlating units 450-1 to 450-M, the pilot pattern rake (PL RAKE) synthesizing sections 460-1 to 460-N and the pilot pattern (PL) data decoding sections 470-1 to 470-N have the same functions as in the first embodiment.

The searcher section 421 inputs the spreading code A outputted from the spreading code generating section 410 and the digital reception signal obtained by converting the burst signals received from the mobile stations into the digital form. The searcher section 421 calculates a correlation component with the spreading code A over the search range to determine a profile and then to detect the path candidates of the reception signal. The detected path candidates are sent to PL kind detecting sections 480-1 to 480-J so as to distinguish the pilot pattern corresponding to each path candidate. Data indicative of the detected path candidates and data indicative of the corresponding pilot patterns are sent to the path control section 430 and then the same operation as in the first embodiment is performed therein.

That is, the path control section 430 determines the paths to which the tracking process should be performed, from the inputted path data and the pilot pattern data to issue instructions to the tracking sections 440-1 to 440-M. The tracking sections 440-1 to 440-M perform the tracking process to the instructed paths, respectively. The correlating sections 450-1 to 450-M determine the correlation component of the reception signal in accordance with the output of the corresponding tracking section. Also, the path control section 430 issues instructions to the pilot pattern rake synthesizing sections to input correlation components from ones of the correlating sections 450-1 to 450-M which correspond to the paths for the same pilot pattern. The pilot pattern rake synthesizing sections 460-1 to 460-N perform rake synthesis to the correlation components of the multi-path for every pilot pattern. Each of the pilot pattern (PL) data decoding section 470-1 to 470-N decodes the signal corresponding to each pilot pattern and extracts the mobile station identifier contained in the decoded signal. Thus, each pilot pattern data decoding section 470-1 to 470-N specify mobile station identification numbers.

Referring to FIG. 8, the operation of searcher section 421, the operation of PL kind detecting section 480-1 to 480-J, and the path control section 430, the tracking sections 440-1 to 440-M, the correlating sections 450-1 to 450-M and the PL RAKE synthesizing section 460-1 to 460-N will be described.

For simple description, it is supposed that the pilot patterns of PL1, PL2 and PL3 are allocated for three mobile station 200-1 to 200-3, respectively, and spectrum spreading is performed using the spreading code A so as to transmit a burst signal in each mobile station. Also, it is supposed that the searcher section 421 outputs ten path candidates in order of larger likelihood level. Further, it is supposed that 10 PL kind detecting sections 480-1 to 480-10 are provided and 10 sets of the tracking section 440-1 to 440-10 and the correlating sections 450-1 to 450-10 are provided.

In such a condition, it is assumed that the spreading code A and a reception signal are inputted and the searcher section 521 outputs 10 paths as s1 to s10.

| order | 01 | 02 | 03 | 04 | 05 | 06 | 07 | 08 | 09 | 10 |
|-------|----|----|----|----|----|----|----|----|----|-----|
| path  | s1 | s2 | s3 | s4 | s5 | s6 | s7 | s8 | s9 | s10 |

Date indicative of the 10 paths outputted from the searcher section 421 is supplied to the PL kind detecting sections 480-1 to 480-10, respectively, such that each PL kind detecting section distinguishes the pilot pattern of the inputted path. Each PL kind detecting section performs in-phase addition of pilot pattern in-phase components between a code sequence of the pilot pattern allocated to the mobile station in advance and a code sequence of the reception signal at the timing indicated by the path data. The PL kind detecting section supplies the pilot pattern having the largest correlation component and the timing to the path control section 430.

It is supposed that the path and the pilot pattern correspond to each other in each PL kind detecting section as described below.

| path | S1  | S2  | S3  | S4 | S5  | S6  | S7  | S8  | S9  | S10 |
|------|-----|-----|-----|----|-----|-----|-----|-----|-----|-----|
| PL   | PL1 | PL2 | PL1 | P3 | PL2 | PL1 | PL1 | PL2 | PL3 | PL2 |

Based on these data, the path control section 430 sends a data of path to be tracked to each tracking section. That is, instructions are issued such that the tracking section 440-1 tracks the path of s1, the tracking section 440-2 tracks the path of s2, the tracking section 440-3 tracks the path of s3, ..., the tracking section 440-10 tracks the path of s10. The correlating section corresponding to each tracking section outputs the correlation component of the reception signal to the spreading code A in the corresponding path.

Further, the path control unit 430 connects the outputs of the correlating sections corresponding to the same PL pattern with the corresponding pilot pattern rake (PL RAKE) synthesizing section to perform rake synthesize of output signals for the same path. That is, since the correlating sections 450-1, 450-3, 450-6, 450-7 output the correlation components of the reception signal for the path of PL1, the output of each correlating section is connected to the PL 1 RAKE synthesizing section 460-1. Since the correlating sections 450-2, 450-5, 450-8, 450-10 output the correlation components of the reception signal for the path of PL2, the output of each correlating section is connected to the PL2 RAKE synthesizing section 460-2. Also, since the correlating sections 450-4, 450-9 output the correlation components of the reception signal for the path of PL3, the output of each correlating section is connected to the PL3 RAKE synthesizing section 460-3.

The signals obtained by performing rake synthesis in the each of the PL RAKE synthesizing sections 460-1 to 460-3 are decoded by the pilot pattern (PL) data decoding sections 470-1 to 470-3 corresponding to the respective pilot patterns. As a result, the identifier data of the mobile station contained in the decoded data is extracted and outputted to specify each mobile station for the reception signal.

In this way, in the spectrum spreading communication system of the present invention, the plurality of paths (the multi-path) having correlation components to the spreading code A in the searcher section. The pilot pattern of each of the detected paths is distinguished in each PL kind detecting section. Further, the tracking operation for each path and correlation component extraction of the reception signal are performed based on the detected path data. Therefore, even if the burst signals using the same spreading code are received at the same time on a same frequency band from the plurality of mobile stations, it is possible to reliably distinguish the signal from each mobile station and to perform rake synthesis. Thus, the communication quality can be greatly improved.

As described above, according to the spectrum spreading communication system of the present invention, a pilot pattern is allocated for the mobile station, and the pilot pattern is distinguished. Therefore, the burst signal can be transmitted using the same spreading code. Compared with the system which distinguishes a mobile station based on the kind of the spreading code, the structure of the reception system can be remarkably simplified. Also, the multi-path or paths can be detected for every pilot pattern. Therefore, even if the same spreading code is used for transmission, the signal from each mobile station can be reliably received. As a result, the effective RAKE synthesis becomes possible so that the speech quality can be remarkably improved.

What is claimed is:

1. A spectrum spreading communication system including a radio base station comprising:
    a receiving section for receiving a radio signal to produce a digital burst signal, wherein transmission data of the radio signal respectively include different pilot patterns and data, are subjected to spectrum spreading using a single spreading code, and are transmitted on a same frequency band;
    a correlation detecting section for performing a tracking operation to said burst signal for each of paths to produce a tracking resultant data, said paths being specified based on a path data, and detecting a component of said burst signal correlated with said spreading code for each path based on said tracking resultant data;
    a rake synthesizing section for performing rake synthesis to said components from said correlation detecting section for each of said pilot patterns; and
    a control section for determining path candidates from said burst signal to output said path data corresponding to said path candidates to said correlation detecting section, and for controlling said rake synthesizing section to perform said rake synthesis to said components from said correlation detecting section for each of said pilot patterns.

2. A spectrum spreading communication system according to claim 1, wherein each of said transmission data includes an identifier data of a mobile station which has transmitted said transmission data, and wherein said radio base station further includes a data decoding section for decoding signals outputted from said rake synthesizing section, and for extracting the mobile station identifier data contained in the decoded signals to specify mobile stations, respectively.

3. A spectrum spreading communication system according to claim 1, wherein said control section includes:
   a plurality of searcher section respectively provided for said pilot patterns, wherein each of said plurality of searcher section determines larger likelihood levels between the corresponding pilot pattern and said burst signal; and
   a path control section for determining the path candidates based on said larger likelihood levels over said pilot patterns to output said path data to said correlation detecting section, and for controlling said rake synthesizing section to perform said rake synthesis to said components from said correlation detecting section for each of said pilot patterns.

4. A spectrum spreading communication system according to claim 3, wherein each of said searcher section performs in-phase addition between a code sequence of said corresponding pilot pattern and a pilot pattern component of said burst signal to determine said path candidates having larger results of the in-phase additions.

5. A spectrum spreading communication system according to claim 1, wherein said control section includes:
   a searcher section for determines said path candidates having larger likelihood levels between said spreading code and said burst signal;
   a plurality of kind detecting sections respectively provided for said pilot patterns, wherein each of said plurality of kind detecting sections determines one of said pilot patterns for each of said path candidates; and
   a path control section for outputting said path data to said correlation detecting section based on the detected pilot patterns by said plurality of kind detecting sections, and for controlling said rake synthesizing section to perform said rake synthesis to said components from said correlation detecting section for each of said pilot patterns.

6. A spectrum spreading communication system according to claim 5, wherein each of said plurality of kind detecting sections performs in-phase addition between a code sequence of said corresponding pilot pattern and a pilot pattern component of said burst signal to determine said path candidates having larger results of the in-phase additions.

7. A spectrum spreading communication system according to claim 1, wherein said correlation detecting section includes:
   a plurality of tracking sections, each of which performs a tracking operation to said burst signal for a corresponding one of said paths to produce a portion of said tracking resultant data; and
   a plurality of correlating sections which are provided for said plurality of tracking sections, and each of which detects a component of said burst signal correlated with said spreading code for each path based on said tracking resultant data.

8. A spectrum spreading communication system according to claim 2, wherein a spreading code decoding section includes said correlation detecting section, said rake synthesizing section, said control section and said data decoding section, and
   wherein said spectrum spreading communication system further comprises a plurality of said spreading code decoding sections respectively provided for a plurality of said spreading codes.

9. In a spectrum spreading communication system including a radio base station and a plurality of mobile stations, a method of communicating from said plurality of mobile stations to said radio base station, comprising the steps of:
   transmitting transmission data from said plurality of mobile stations as radio signals on a same frequency band, wherein said transmission data respectively include different pilot patterns and data, the different pilot patterns are allocated to said plurality of mobile stations, and said transmission data are subjected to spectrum spreading by said plurality of mobile stations using a single spreading code, respectively;
   receiving said radio signals to produce a digital signal;
   generating path data from said digital signal based on said different pilot patterns;
   determining each of paths contained in said digital signal based on said path data; and
   detecting a component of said digital signal that is correlated with said spreading code for said each path.

10. A method according to claim 9, wherein each of said transmission data includes an identifier data of each of said first mobile stations, and
    wherein said method further includes:
       performing rake synthesis for each of said pilot patterns to produce rake synthesis signals; and
       decoding the rake synthesis signals to extract said identifier data of said plurality of mobile stations contained in the decoded signals to specify mobile stations.

11. A method according to claim 10, wherein said determining step includes:
    determining larger likelihood levels between each of said pilot patterns and said digital signal; and
    determining path candidates based on said larger likelihood levels over said pilot patterns to generate said path data.

12. A method according to claim 11, wherein said step of determining larger likelihood levels includes performing in-phase addition between a code sequence of said corresponding pilot pattern and a pilot pattern component of said digital signal.

13. A method according to claim 12, wherein said step of determining the path candidates includes determining said path candidates having larger results of the in-phase additions.

14. A method according to claim 9, wherein said determining step includes:
    determining said path candidates having larger likelihood levels between said spreading code and said digital signal;
    determining one of said pilot patterns for each of said path candidates; and
    generating said path data based on the detected pilot patterns.

15. A method according to claim 14, wherein said step of determining one of said pilot patterns includes:
    performing in-phase addition between a code sequence of said corresponding pilot pattern and a pilot pattern component of said digital signal.

16. A method according to claim 11, wherein said determining path candidates, said performing rake synthesis, and said decoding the rake synthesis signals are performed for each of a plurality of said spreading codes.

17. In a spectrum spreading communication system including a radio base station and a plurality of mobile stations, a method of communicating from said plurality of mobile stations to said radio base station, comprising the steps of:

transmitting transmission data from said plurality of mobile stations as radio signals on a same frequency band, wherein said transmission data respectively include different pilot patterns and data, the different pilot patterns are allocated to said plurality of mobile stations, and said transmission data are subjected to spectrum spreading by said plurality of mobile stations using a single spreading code, respectively:

receiving said radio signals to produce a digital burst signal;

determining path candidates from said burst signal to generate path data corresponding to said path candidates; and detecting a component of said burst signal correlated with said spreading code for each path based on said path data.

18. A method according to claim 17, wherein each of said transmission data includes an identifier data of each of said first mobile stations, and wherein said method further includes:

performing rake synthesis for each of said pilot patterns to produce rake synthesis signals; and decoding the rake synthesis signals to extract said identifier data of said plurality of mobile stations contained in the decoded signals to a specify mobile stations.

19. A method according to claim 17, wherein said determining step includes:

determining larger likelihood levels between each of said pilot patterns and said burst signal; and determining the path candidates based on said larger likelihood levels over said pilot patterns to generate said path data.

20. A method according to claim 19, wherein said step of determining larger likelihood levels includes performing in-phase addition between a code sequence of said corresponding pilot pattern and a pilot pattern component of said burst signal.

21. A method according to claim 20, wherein said step of determining the path candidates includes determining said path candidates having larger results of the in-phase additions.

22. A method according to claim 17, wherein said determining step includes:

determining said path candidates having larger likelihood levels between said spreading code and said burst signal;

determining one of said pilot patterns for each of said path candidates; and generating said path data based on detected pilot patterns.

23. A method according to claim 22, where in said step of determining one of said pilot patterns includes:

performing in-phase addition between a code sequence of said corresponding pilot pattern and a pilot pattern component of said burst signal.

24. A method according to claim 18, further comprising the steps of:

performing a tracking operation to said burst signal for each of paths to produce a tracking result data, said paths being specified based on a path data; and performing rake synthesis for each of said pilot patterns to produce rake synthesis signals for communication.

25. A method according to claim 24, further comprising the step of performing said step of determining path candidates, said step of performing a tracking operation, said step of performing rake synthesis, and said step of encoding the rake synthesis signals for each of a plurality of said spreading codes.

* * * * *